L. I. BODENHAMER.
Stalk Trimmer and Cutter.

No. 205,470. Patented July 2, 1878.

WITNESSES
Saml R. Turner
C. M. Sites

INVENTOR
Levi I. Bodenhamer
R. S. & A. P. Lacey ATTORNEY

UNITED STATES PATENT OFFICE.

LEVI I. BODENHAMER, OF KERNERSVILLE, NORTH CAROLINA.

IMPROVEMENT IN STALK TRIMMER AND CUTTER.

Specification forming part of Letters Patent No. 205,470, dated July 2, 1878; application filed May 21, 1878.

*To all whom it may concern:*

Be it known that I, LEVI I. BODENHAMER, of Kernersville, in the county of Forsyth and State of North Carolina, have invented certain new and useful Improvements in Stalk Trimmer and Cutter; and I do hereby declare that the following is a full, clear, and exact description thereof, which will enable others skilled in the art to which it pertains to make and use the same, reference being had to the accompanying drawing, and to the letters of reference marked thereon, which form a part of this specification.

This invention has for its object to furnish a machine that will trim the branches off and cut down cotton-stalks, so that the latter may be readily turned under by the plow.

It consists in a hinged or pivoted trimmer, arranged to have a vertical or chopping movement, and in a horizontal revolving cutter, all operated simultaneously by a single driving-wheel, as will be hereinafter fully explained.

Figure 1:
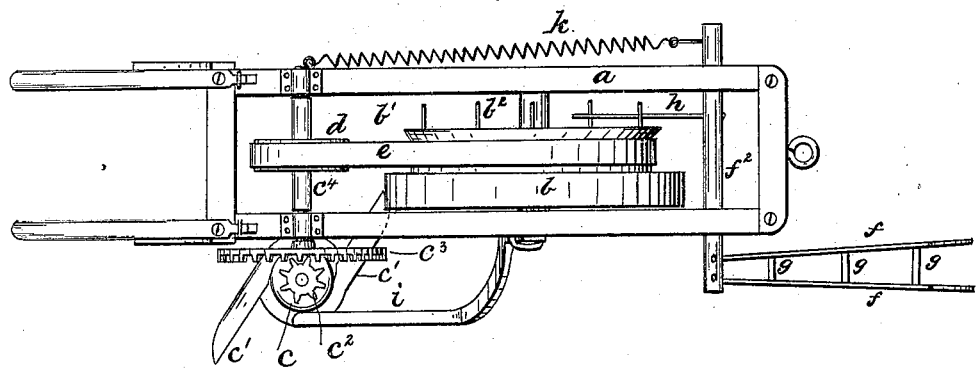
Figure 2:
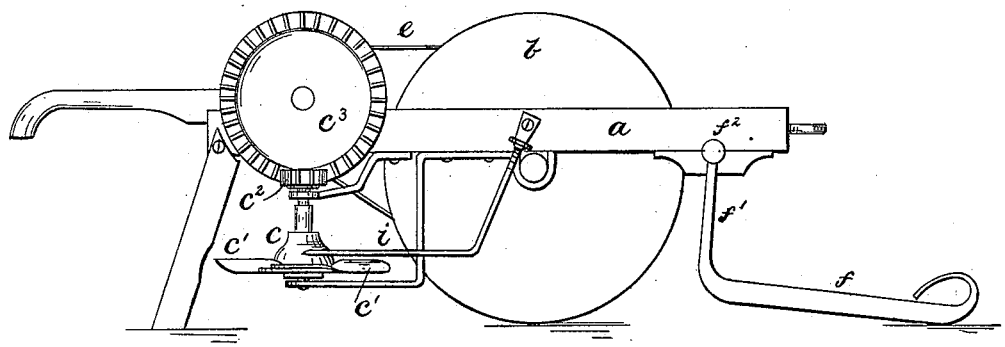

In the drawings, Figure 1 is a plan, and Fig. 2 is a side elevation, of a machine constructed according to my invention.

$a$ is the frame which supports the several operating parts of my invention. $b$ is the driving-wheel, journaled in the frame $a$, and having on its side a pulley, $b^1$, and pins $b^2$, which project out at right angles to the side of the said pulley. $c$ is the cutter-head, journaled to the frame, so that its blades $c^1$ $c^1$ revolve horizontally near the ground. Its axis extends upward, and is provided with a pinion, $c^2$, which meshes with the gear $c^3$, having its shaft $c^4$ journaled in the frame $a$. $d$ is the pulley affixed on the shaft $c^4$, and $e$ is the belt passing over the pulleys $b^1$ and $d$, as shown.

$f$ are two parallel cutters or blades, having their rear ends united, and provided with the vertical arm $f^1$, which is secured to a rotating shaft, $f^2$, affixed in bearings on the frame $a$.

The blades $f$ are arranged so that they descend near enough to the ground to trim off the lower branches of the cotton-stalks. The blades $f$ trim off the branches which extend laterally from the direction of the cotton row. In order to trim off the branches which extend along in line with the cotton-row, I connect the cutters or blades by a series of cross-blades, $g$, as shown.

Affixed to the shaft $f^2$ is a rod or arm, $h$, which extends back horizontally past the rim of the driving-wheel $b$, and is engaged by the pins $b^2$, which, as the machine is moved forward, depress the arm and raise the forward end of the cutters $f$, so that they are raised to the top of the cotton-stalks. When the engaging-pin has cleared the arm $h$ the blades $f$ drop to the position shown in Fig. 2, and in their descent trim off all the branches, leaving only the bare main stalk standing. In the farther advance of the machine the blades $c^1$, cutting against the bar $i$, cut down the main stalks.

$k$ is a spring arranged in connection with the frame $a$ and shaft $f^2$, and is designed to give greater force and effectiveness to the blow of the blades $f$.

I have shown but one set of blades $f$ and cutters $c^1$; but it will be readily understood that another set may be arranged on the opposite side of the frame $a$, and be operated by the single driving-wheel $b$ and pulleys $b^1$ and $d$.

Having described my invention, what I claim, and desire to secure by Letters Patent, is—

1. The blades $f\ f$, having the cross-bars or cutters $g$, and secured together at their rear ends and to the vertical arm $f^1$, in combination with the shaft $f^2$, having arm $h$, and wheel $b$, having pins $b^2$, for the purposes set forth.

2. The single driving-wheel $b$, provided with the side pulleys $b^1$ and projecting pins $b^2$, arranged in combination with and for the purpose of operating simultaneously the horizontal cutters $c^1$ and the vertical cutters or trimmers $f$, substantially as set forth.

In testimony that I claim the foregoing as my own I affix my signature in presence of two witnesses.

LEVI ISAAC BODENHAMER.

Witnesses:
F. B. WHEELER,
L. E. BODENHAMER.